(12) United States Patent
Coulomb et al.

(10) Patent No.: US 11,428,598 B2
(45) Date of Patent: Aug. 30, 2022

(54) LEAK DETECTOR FOR CHECKING SEALING TIGHTNESS OF AN OBJECT COMPRISING A PUMPING DEVICE INCLUDING A TURBOMOLECULAR PUMP AND FIRST AND SECOND VACUUM PUMPS HAVING AT LEAST ONE FIRST AND SECOND PUMPING STAGE WHEREIN THE OUTLET OF THE SECOND VACUUM PUMP IS CONNECTED BETWEEN PUMPING STAGES OF THE FIRST VACUUM PUMP

(71) Applicant: PFEIFFER VACUUM, Annecy (FR)

(72) Inventors: Julien Coulomb, Saint Pierre en Faucigny (FR); Cyrille Nomine, Epagny (FR)

(73) Assignee: PFEIFFER VACUUM, Annecy (FR)

( * ) Notice: Subject to any disclaimer, the term of this patent is extended or adjusted under 35 U.S.C. 154(b) by 319 days.

(21) Appl. No.: 16/753,524

(22) PCT Filed: Sep. 24, 2018

(86) PCT No.: PCT/EP2018/075823
§ 371 (c)(1),
(2) Date: Apr. 3, 2020

(87) PCT Pub. No.: WO2019/076583
PCT Pub. Date: Apr. 25, 2019

(65) Prior Publication Data
US 2020/0319053 A1    Oct. 8, 2020

(30) Foreign Application Priority Data

Oct. 19, 2017 (FR) .................................. 17 59864

(51) Int. Cl.
*G01M 3/22* (2006.01)
*F04D 19/04* (2006.01)
(Continued)

(52) U.S. Cl.
CPC ............. *G01M 3/223* (2013.01); *F04B 23/04* (2013.01); *F04B 37/14* (2013.01); *F04D 19/04* (2013.01);
(Continued)

(58) Field of Classification Search
CPC ........ F04D 19/04; F04D 19/042; F04D 25/16; G01M 3/205; G01M 3/223; G01M 3/00;
(Continued)

(56) References Cited

U.S. PATENT DOCUMENTS 4,779,449 A * 10/1988 Bley ...................... G01M 3/229
73/40.7
4,919,599 A * 4/1990 Reich .................... G01M 3/202
417/423.4

(Continued)

FOREIGN PATENT DOCUMENTS

| CN | 103119413 A | 5/2013 |
|---|---|---|
| CN | 105556272 A | 5/2016 |
| DE | 199 62 006 A1 | 6/2001 |

OTHER PUBLICATIONS

International Search Report dated Apr. 3, 2019 in PCT/EP2018/075823 filed on Sep. 24, 2018, 2 pages.
(Continued)

*Primary Examiner* — Kenneth J Hansen
*Assistant Examiner* — Benjamin Doyle
(74) *Attorney, Agent, or Firm* — Oblon, McClelland, Maier & Neustadt, L.L.P.

(57) ABSTRACT

A leak detector for checking the sealing tightness of an object to be tested includes a detection inlet to be connected to the object, a first pumping device, and a gas detector. The first pumping device includes a first rough vacuum pump, at least one second rough vacuum pump, and a turbomolecular pump. The gas detector is connected to the turbomolecular
(Continued)

Figure 1:
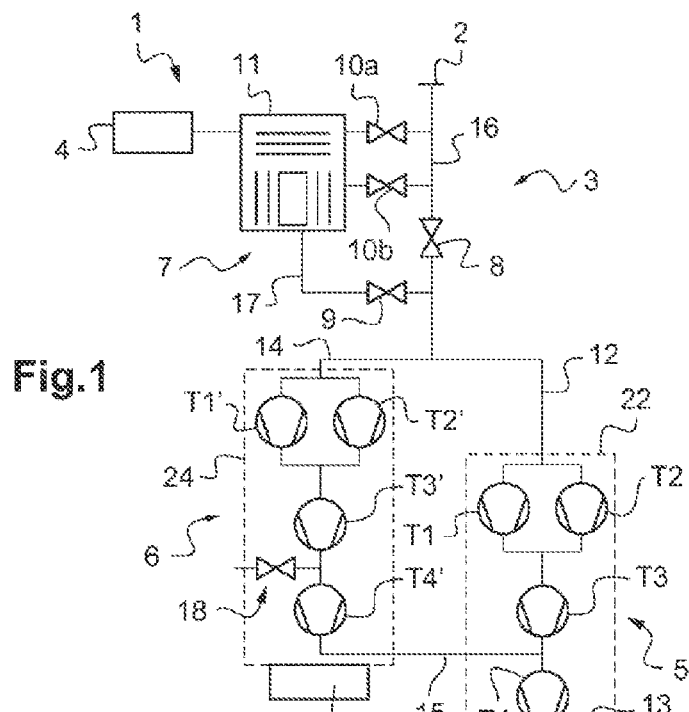

pump. The outlet of the at least one second rough vacuum pump is connected to the first rough vacuum pump, between two in-series pumping stages of the first rough vacuum pump.

10 Claims, 2 Drawing Sheets

(51) Int. Cl.
| | |
|---|---|
| *F04D 25/16* | (2006.01) |
| *G01M 3/20* | (2006.01) |
| *F04B 23/04* | (2006.01) |
| *F04B 37/14* | (2006.01) |
| *F04B 41/06* | (2006.01) |

(52) U.S. Cl.
CPC ........... *F04D 19/042* (2013.01); *F04D 25/16* (2013.01); *G01M 3/205* (2013.01); *F04B 41/06* (2013.01)

(58) Field of Classification Search
CPC ............ G01M 3/02; G01M 3/26; G01M 3/04; G01M 3/20; G01M 3/202; F04B 23/04; F04B 37/14; F04B 41/06
USPC .................................................... 73/40, 40.7
See application file for complete search history.

(56) References Cited

U.S. PATENT DOCUMENTS

| | | | | | |
|---|---|---|---|---|---|
| 5,107,697 | A | * | 4/1992 | Tallon | G01M 3/202 73/40.7 |
| 5,226,314 | A | * | 7/1993 | Baret | G01M 3/202 73/40.7 |
| 5,537,857 | A | * | 7/1996 | Grosse Bley | G01M 3/202 73/40 |
| 5,585,548 | A | * | 12/1996 | Grosse Bley | G01M 3/202 73/40.7 |
| 5,703,281 | A | * | 12/1997 | Myneni | G01M 3/202 73/40.7 |
| 5,708,194 | A | * | 1/1998 | Bohm | G01N 33/0011 73/40.7 |
| 5,880,357 | A | * | 3/1999 | Bohm | G01M 3/202 73/40.7 |
| 5,900,537 | A | * | 5/1999 | Bohm | G01M 3/202 73/40.7 |
| 6,021,663 | A | * | 2/2000 | Bohm | G01M 3/202 73/40.7 |
| 6,415,650 | B1 | * | 7/2002 | Bohm | G01M 3/202 73/40 |
| 7,033,142 | B2 | * | 4/2006 | Conrad | F04D 25/00 417/205 |
| 7,717,681 | B2 | * | 5/2010 | Bohm | G01M 3/202 73/40.7 |
| 2003/0233866 | A1 | * | 12/2003 | Widt | G01M 3/229 73/40 |
| 2005/0066708 | A1 | * | 3/2005 | Grosse-Bley | G01M 3/202 73/40.7 |
| 2005/0199042 | A1 | * | 9/2005 | Perkins | G01M 3/202 73/40.7 |
| 2006/0169028 | A1 | * | 8/2006 | Beyer | F04D 27/00 73/40.7 |
| 2007/0000309 | A1 | * | 1/2007 | Bohm | G01M 3/202 73/40.7 |
| 2013/0186183 | A1 | * | 7/2013 | Dobler | G01M 3/26 73/49.3 |
| 2014/0096595 | A1 | * | 4/2014 | Wetzig | G01M 3/226 73/40.7 |
| 2016/0223424 | A1 | * | 8/2016 | Hilgers | G01L 19/0654 |
| 2018/0328809 | A1 | * | 11/2018 | Bruhns | G01M 3/205 |
| 2019/0162193 | A1 | * | 5/2019 | Grosse Bley | F04D 19/042 |

OTHER PUBLICATIONS

Chew, "Mechanical Vacuum Pumps", May 2006, Retrieved from the Internet: https://cas.web.cern.ch/sites/cas.web.cern.ch/files/lectures/platjadaro-2006/chew.pdf, XP055481854, 76 total pages.
Office Action dated Feb. 14, 2022 in corresponding Chinese Patent Application No. 201880067380.7 (with English Translation), 10 pages.
Combined Chinese Office Action and Search Report dated Nov. 10, 2021 in Chinese Patent Application No. 201880067380.7 (with English translation), 12 pages.
Combined Chinese Office Action and Search Report dated May 10, 2022, in corresponding Chinese Patent Application No. 201880067380.7 (with English Translation of Category of Cited Documents), 6 pages.

* cited by examiner

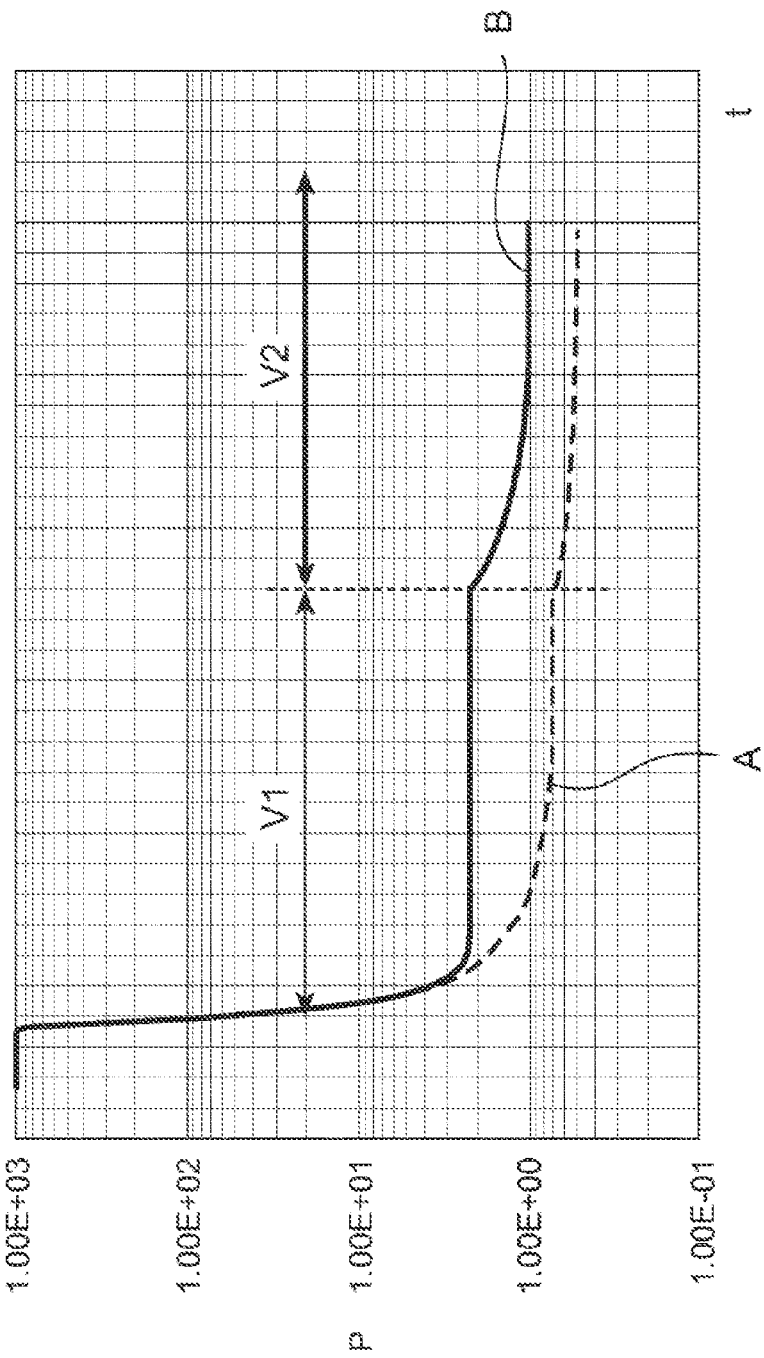

LEAK DETECTOR FOR CHECKING SEALING TIGHTNESS OF AN OBJECT COMPRISING A PUMPING DEVICE INCLUDING A TURBOMOLECULAR PUMP AND FIRST AND SECOND VACUUM PUMPS HAVING AT LEAST ONE FIRST AND SECOND PUMPING STAGE WHEREIN THE OUTLET OF THE SECOND VACUUM PUMP IS CONNECTED BETWEEN PUMPING STAGES OF THE FIRST VACUUM PUMP

The present invention relates to a leak detector for checking the sealing tightness of an object to be tested.

A so-called spray leak detection technique consists of evacuating the gas inside an object to be tested to a low pressure by means of a leak detector. An atmosphere enriched with tracer gas is then created around the object by spraying. The leak detector checks whether any tracer gas is found in the gases taken in.

This method relies on the detection of tracer gas passing through any leaks in the object to be tested. Helium or hydrogen is generally used as a tracer gas, as these gases pass through small leaks more easily than other gases, due to the small size of their molecules and their high speed of movement.

To lower the pressure in the object to be tested, the leak detector includes a pumping system that can consist of a rough vacuum pump and a turbomolecular vacuum pump mounted upstream of and in series with the rough vacuum pump. The turbomolecular vacuum pump is first isolated from the object to be tested to lower the pressure in the object to be tested using the rough vacuum pump, then connected to the object to be tested after the pressure has crossed a lower threshold.

The ultimate vacuum pressure achieved by the pumping system must be as low as possible in order to obtain good measuring sensitivity. The pumping rate of the rough vacuum pump must also be sufficient to rapidly reduce the pressure inside the object to be tested to as low as possible.

In order to lower the ultimate vacuum pressure, one solution consists of using a rough vacuum pump having a larger number of pumping stages mounted in series. This configuration does not however make it possible to improve the pumping rate during evacuation.

In order to increase the pumping rate, one solution consists of connecting a second rough vacuum pump in parallel with the first. This solution does not however make it possible to lower the ultimate vacuum pressure. This can generate significant background noise, making the detection of weak helium signals difficult.

Furthermore, the pumping performance of rough vacuum pumps, notably diaphragm vacuum pumps, can deteriorate as they age, increasing the ultimate vacuum pressures that can be achieved. This can prevent the crossing of the lower pressure threshold enabling pumping to switch to the turbomolecular vacuum pump.

One solution consists of using an additional turbomolecular vacuum pump, inserted between the main turbomolecular vacuum pump and the rough vacuum pump. This additional turbomolecular vacuum pump is connected to the object to be tested on evacuation of the object at atmospheric pressure. This solution can however be relatively costly. In addition, the repeated air inlets that must be absorbed by the additional turbomolecular vacuum pump can be sources of malfunctions.

One of the aims of the present invention is to propose a leak detector that makes it possible to achieve a low ultimate vacuum pressure while having a high pumping rate at atmospheric pressure, that must be robust over time, with a reasonable cost and footprint.

To this end, the invention relates to a leak detector for checking the sealing tightness of an object to be tested, the leak detector comprising:
  a detection inlet for connecting to an object to be tested,
  a pumping device including:
    a first rough vacuum pump including a first drive motor, at least one first and one second pumping stages mounted in series between an inlet and an outlet,
    at least one second rough vacuum pump including a second drive motor, at least one first and one second pumping stages mounted in series between an inlet and an outlet, the inlets of the rough vacuum pumps being connected in parallel to the detection inlet by means of a first isolation valve,
    a turbomolecular vacuum pump having an outlet connected between the first isolation valve and the inlets of the rough vacuum pumps by means of a second isolation valve,
  a gas detector connected to the turbomolecular vacuum pump,
characterized in that the outlet of the at least one second rough vacuum pump is connected to the first rough vacuum pump, between two in-series pumping stages of the first rough vacuum pump.

The idea behind the invention is that of the innovative use of rough vacuum pumps, which are conventionally used to discharge gases to be pumped at ambient pressure, by connecting the outlet of one of the rough vacuum pumps between the pumping stages of the other. Connecting the second rough vacuum pump between the pumping stages of the first rough vacuum pump makes it possible to obtain both the pumping rate of the first pumping stages of the at least two rough vacuum pumps and a reduction in the ultimate vacuum pressure resulting from the pumping stages of the second rough vacuum pump and the last pumping stage(s) of the first rough vacuum pump. At ultimate vacuum, pumping is effective through the pumping stages of the second rough vacuum pump, to which are added the at least one last pumping stage of the first rough vacuum pump succeeding the connection of the outlet of the second rough vacuum pump. This arrangement is counter-intuitive. It would rather be thought that the ultimate vacuum pressure obtained would be identical to the pressure obtained with a single rough vacuum pump.

The ultimate vacuum pressure in the object to be tested can therefore be lowered, This makes it possible to reduce the background tracer gas and therefore enables a significant improvement in the measuring sensitivity.

The lowering of the ultimate vacuum pressure also makes it possible to obtain a margin in relation to the performance loss that can be caused by the aging of the rough vacuum pumps. Improved robustness is therefore obtained in relation to the aging of the pumps.

According to one or more features of the leak detector, taken individually or in combination:
  the outlet of the at least one second rough vacuum pump is connected between the penultimate pumping stage and the last pumping stage of the first rough vacuum pump,
  the at least two rough vacuum pumps are diaphragm pumps,
  the diaphragms of the pumping stages of the first rough vacuum pump are configured to be moved by means of the first drive motor and the diaphragms of the pumping stages of the second rough vacuum pump are configured to be moved by means of the second drive motor, the at least two rough vacuum pumps are screw pumps or scroll pumps, the at least two rough vacuum pumps include two rotors, for example Roots rotors, the at least two rough vacuum pumps include two rotors configured to be driven to rotate in a synchronized manner in opposite directions in each pumping stage, the rotors of the first rough vacuum pump are configured to be driven by the first drive motor and the rotors of the second rough vacuum pump are configured to be driven by the second drive motor, the at least two rough vacuum pumps have identical pumping stage configurations, at least one rough vacuum pump includes at least two first pumping stages mounted in parallel, at least one rough vacuum pump includes at least three pumping stages mounted in series, the leak detector includes a purge device configured to supply a purge gas between two pumping stages of the second rough vacuum pump.

Further advantages and features will become apparent on reading the following description of a particular, but in no way limitative, embodiment of the invention, together with the attached drawings, in which:

FIG. 1 shows a diagrammatic view of a leak detector according to a first embodiment.

FIG. 2 shows a graph showing the pressure drop in an object to be tested (in mbar) connected to the leak detector, obtained as a function of time (in seconds) for two diaphragm rough vacuum pumps according to the invention (curve A) and two diaphragm rough vacuum pumps with common inlets and common outlets (curve B), for pumping at maximum rotational speeds and for pumping at reduced rotational speeds.

Figure 3:
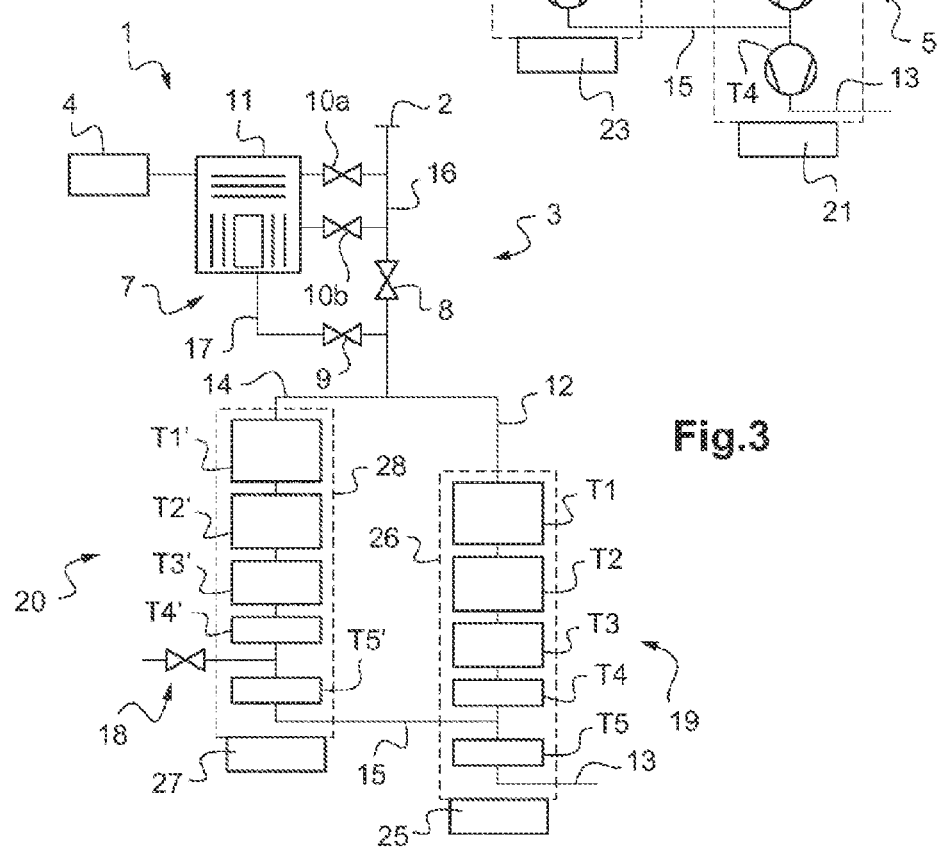

FIG. 3 shows a diagrammatic view of a leak detector according to another embodiment.

In the figures, identical elements have the same reference numbers.

The following embodiments are examples. Although the description refers to one or more embodiments, this does not necessarily mean that each reference relates to the same embodiment, or that the features only apply to a single embodiment. Simple features of different embodiments can also be combined or interchanged to provide other embodiments.

Rough vacuum pump is given to mean a positive displacement vacuum pump that takes in, transfers and then discharges a gas to be pumped. In conventional use, a rough vacuum pump is configured so that it can discharge a gas to be pumped at ambient pressure.

"Upstream" is used to describe an element that is placed before another in relation to the direction of flow of the gas. Conversely, "downstream" is used to describe an element placed after another in relation to the direction of flow of the gas to be pumped, the element situated upstream being at a lower pressure than the element situated downstream.

"Ultimate vacuum" is given to mean the minimum pressure obtained by a vacuum pump when no flow of gas is introduced, except any negligible background gas flows.

FIG. 1 shows a leak detector 1 for checking the sealing tightness of an object to be tested, such as by tracer gas spraying.

The leak detector 1 includes a detection inlet 2 for connecting to an object to be tested, a pumping device 3 and a gas detector 4.

The pumping device 3 includes a first rough vacuum pump 5, at least one second rough vacuum pump 6, a turbomolecular vacuum pump 7, first and second isolation valves 8, 9 and at least one sampling valve 10a, 10b.

The gas detector 4 is connected to the turbomolecular vacuum pump 7, for example to the intake 11 thereof. The gas detector 4 includes for example a mass spectrometer.

The outlet 17 of the turbomolecular vacuum pump 7 is connected to the inlets 12, 14 of the rough vacuum pumps 5, 6 by means of the second isolation valve 9.

The detection inlet 2 of the leak detector 1 is for example connected to an intermediate stage of the turbomolecular vacuum pump 7, by means of at least one sampling valve 10a, 10b. The pumping device 3 includes for example at least two sampling valves 10a, 10b, each valve 10a, 10b being connected to a separate intermediate stage of the turbomolecular vacuum pump 7 so that the sampling flow can be adjusted to the level of the leak rate, the sampling valve 10a, 10b being connected to a bypass of a pipe of the vacuum line 16 arranged between the detection inlet 2 and the first isolation valve 8.

The second isolation valve 9 is connected to the vacuum line 16 between the first isolation valve 8 and the inlets 12, 14 of the rough vacuum pumps 5, 6.

Closing the sampling valves 10a, 10b, and optionally the second isolation valve 9, makes it possible to evacuate the object to be tested connected to the detection inlet 2 using the rough vacuum pumps 5, 6 when the first isolation valve 8 is opened.

The first rough vacuum pump 5 includes at least one first pumping stage T1, T2 and one second pumping stage T3, mounted in series one after the other between an inlet 12 and an outlet 13 of the first rough vacuum pump 5, and in which a gas to be pumped can flow. The first rough vacuum pump 5 includes a first drive motor 21. The pumping stages T1, T2, T3, T4 of the first rough vacuum pump 5 are arranged in a first casing 22 of the first rough vacuum pump 5.

The second rough vacuum pump 6 includes at least one first pumping stage T1', T2' and one second pumping stage T3', mounted in series one after the other between an inlet 14 and an outlet 15 of the second rough vacuum pump 6, and in which a gas to be pumped can flow. The second rough vacuum pump 6 includes a second drive motor 23. The pumping stages T1', T2', T3', T4' of the second rough vacuum pump 6 are arranged in a second casing 24 of the second rough vacuum pump 6.

The first and second drive motors 21, 23 are independent of each other.

Each pumping stage T1-T4, T1'-T4' comprises a respective inlet and outlet.

The pumping stages of the same rough vacuum pump can be connected in parallel, the inlets being connected to each other and the outlets being connected to each other.

The pumping stages of the same rough vacuum pump can be connected in series one after another by respective interstage channels connecting the outlet (or discharge) of the previous pumping stage or the common outlet of several previous pumping stages, to the inlet (or intake) of the subsequent stage or to the common inlet of several subsequent pumping stages.

The pumping stages T1-T4, T1'-T4' of the same rough vacuum pump have a swept volume, that is a pumped gas volume, that decreases (or is the same) with the pumping stages mounted in series, the first pumping stage(s) T1, T2, T1', T2' having the largest swept volume and the last pumping stage T4, T4' having the smallest swept volume.

In this embodiment, the first rough vacuum pump 5 includes two first pumping stages T1, T2 mounted in parallel. These first pumping stages T1, T2 are mounted in series with and upstream of a second pumping stage T3, mounted in series with and upstream of a third pumping stage T4.

The second rough vacuum pump 6 includes two first pumping stages T1', T2' mounted in parallel. These two first pumping stages T1', T2' are mounted in series with and upstream of a second pumping stage T3', mounted in series with and upstream of a third pumping stage T4'.

The inlets 12, 14 of the rough vacuum pumps 5, 6 are connected in parallel to the detection inlet 2 by pipes of a vacuum line 16 of the pumping device 3, by means of the first isolation valve 8.

In this first embodiment, the rough vacuum pumps 5, 6 are diaphragm pumps. Each pumping stage includes a diaphragm driven by an eccentric so that the movement of the diaphragm accompanied by inlet and outlet flap valves allows the pumping of a gas.

In the first rough vacuum pump 5, the eccentrics that move the diaphragms of the pumping stages T1-T4 are rotated by the first drive motor 21.

In the second rough vacuum pump 6, the eccentrics that move the diaphragms of the pumping stages T1'-T4' are rotated by the second drive motor 23.

The two rough vacuum pumps 5, 6 are diaphragm vacuum pumps having identical pumping stage configurations: the pumping rates are the same, each rough vacuum pump having three pumping stages in series, the first pumping stage having two pumping stages in parallel.

The outlet 15 of the second rough vacuum pump 6 is connected to the first rough vacuum pump 5, between two in-series pumping stages T3, T4 of the first rough vacuum pump 5, such as between the penultimate pumping stage T3 and the last pumping stage T4. The outlet 15 is for example connected to the last interstage channel of the first rough vacuum pump 5.

The idea behind the invention is that of the innovative use of rough vacuum pumps, which are conventionally used to discharge gases to be pumped at ambient pressure, by connecting the outlet of one of the rough vacuum pumps between the pumping stages of the other. Connecting the second rough vacuum pump 6 between the pumping stages T3, T4 of the first rough vacuum pump 5 makes it possible to obtain both a doubled pumping flow and a lowering of the ultimate vacuum pressure. At ultimate vacuum, pumping is effective through the three pumping stages T1'-T4' of the second rough vacuum pump 6, to which is added the last pumping stage T4 of the first rough vacuum pump 5. This arrangement is counter-intuitive. It would rather be thought that the ultimate vacuum pressure obtained would be identical to the pressure obtained with a single rough vacuum pump.

The leak detector 1 can include a purge device 18 configured to supply a purge gas between two pumping stages T3', T4' of the second rough vacuum pump 6, such as between the penultimate pumping stage T3' and the last pumping stage T4'. A single purge device 18 thus makes it possible to purge both the last pumping stage T4' of the second rough vacuum pump 6 and the last pumping stage T4 of the first rough vacuum pump 5.

A pressure sensor can be arranged in the vacuum line 16 to measure the pressure in the pipes connecting the at least one sampling valve 10a, 10b, the isolation valves 8, 9 and the detection inlet 2.

The isolation valves 8, 9 and sampling valves 10a, 10b are for example solenoid valves that can be controlled by a control unit of the leak detector 1. The control unit of the leak detector 1 includes one or more controllers or microcontrollers or computers, including memories and programs suitable for controlling the solenoid valves 8, 9, 10a, 10b, notably as a function of the pressure measured in the vacuum line 16, and for managing a user interface of the leak detector 1, such as a remote control and/or a control panel.

An example of the use of the leak detector 1 will now be described.

Initially, the object to be tested is considered to be connected to the detection inlet 2 and the isolation valves 8, 9 and sampling valves 10a, 10b are considered to be closed.

The user starts a measurement cycle.

The first isolation valve 8 inserted between the detection inlet 2 and the inlets 12, 14 of the rough vacuum pumps 5, 6 opens.

The leak detector 1 then obtains the pumping flow of the two rough vacuum pumps 5, 6, equivalent to four pumping stages T1, T2, T1', T2' taking in gas in parallel from the object to be tested.

The pressure decreases rapidly in the vacuum line 16.

When the pressure measured in the vacuum line 16 is less than or equal to a low pressure threshold, for example less than or equal to 500 Pa (or 5 mbar), the first isolation valve 8 is controlled to close. The second isolation valve 9 and one of the sampling solenoid valves 10a, 10b are controlled to open in order to connect the turbomolecular vacuum pump 7 and the gas detector 4 to the detector inlet 2.

The leak detector 1 then obtains the pumping flow of the two rough vacuum pumps 5, 6, equivalent to five pumping stages T1', T2', T3', T4', T4 in series.

The user can look for leaks by spraying tracer gas around the object to be tested. The gas detector 4 measures an increase in tracer gas in the presence of a leak in the object to be tested.

The leak detector 1 can also be used to perform a sealing tightness test on an object to be tested by means of the so-called "sniffer" test. To this end, the object to be tested is filled in advance with tracer gas, for example pressurized. A sniffer probe is connected to the detection inlet 2 of the leak detector 1 to take in the gases surrounding the object to be tested. Some of the gases sampled in this way, which might contain the tracer gas revealing a leak, are then analyzed by the gas detector 4.

When the leak detector 1 is no longer in use, for example after a predetermined period, a stand-by mode can be provided, in which the rotational speed of the rough vacuum pumps 5, 6 is reduced. The reduction in the rotational speed of the rough vacuum pumps 5, 6 makes it possible to reduce the electricity consumption of the leak detector 1 when it is not in use. This mode can be triggered manually or can be detected and controlled by the control unit.

The advantages provided by the invention can be more clearly understood by viewing the graph in FIG. 2, which illustrates the pumping performance obtained for two diaphragm rough vacuum pumps 5, 6 such as those described above with the outlet 15 of the second rough vacuum pump 6 connected between the penultimate pumping stage T3 and the last pumping stage T4 of the first rough vacuum pump 5 (curve A) and for two diaphragm rough vacuum pumps used conventionally having common inlets and common outlets (curve B).

The curves A, B show a pressure drop in an object to be tested as a function of time, for pumping obtained at maximum rotational speeds V1 of the rough vacuum pumps and for pumping obtained at reduced rotational speeds V2 (of the order to 8 to 9% of the maximum rotational speed).

It will be noted in this example that, for high pressures, above 3 mbar, the pumping flow is the same for the rough vacuum pumps 5, 6 according to the invention as for two rough vacuum pumps mounted in parallel with a common outlet. The leak detector 1 according to the invention therefore obtains the pumping rate of the first pumping stages T1, T2, T1', T2' of the two rough vacuum pumps 5, 6. Connecting the outlet 15 of the second rough vacuum pump 6 between the penultimate pumping stage T3 and the last pumping stage T4 of the first rough vacuum pump 5 does not reduce the pumping performance of the two rough vacuum pumps 5, 6 at high pressures.

At ultimate vacuum, it will be noted that the pressure obtained with the rough vacuum pumps 5, 6 at maximum speed V1 according to the invention reaches 0.7 mbar, whereas the pressure stabilizes at around 2.2 mbar with rough vacuum pumps having a common outlet. The ultimate vacuum pressure is therefore reduced by a factor of approximately three.

At a reduced rotational speed V2, the ultimate vacuum pressure obtained with the rough vacuum pumps 5, 6 according to the invention reaches 0.5 mbar, whereas the pressure stabilizes around an ultimate vacuum pressure of the order of 1 mbar with rough vacuum pumps having a common outlet. The ultimate vacuum pressure can therefore be reduced by a factor of two.

The ultimate vacuum pressure in the object to be tested can therefore be lowered. This makes it possible to reduce the background tracer gas and therefore enables a significant improvement in the measuring sensitivity.

The lowering of the ultimate vacuum pressure also makes it possible to obtain a margin in relation to the performance loss that can be caused by the aging of the rough vacuum pumps 5, 6. Improved robustness is therefore obtained in relation to the aging of the pumps.

FIG. 3 illustrates another embodiment in which the first and second rough vacuum pumps 19, 20 include two rotors driven so that they rotate in a synchronized manner in opposite directions in each pumping stage T1-T2, T1'-T2'. The rough vacuum pumps 19, 20 include for example five pumping stages mounted in series. In the first rough vacuum pump 19, the shafts holding the rotors extend in the pumping stages T1-T5 mounted in series one after another. They are driven by a first drive motor 25 of the first rough vacuum pump 19. The pumping stages T1-T5 are also arranged in a first casing 26 of the first rough vacuum pump 19.

In the second rough vacuum pump 20, the shafts holding the rotors extend in the pumping stages T1'-T5' mounted in series one after another. They are driven by a second drive motor 27 of the second rough vacuum pump 20. The pumping stages T1'-T5' are also arranged in a second casing 28 of the second rough vacuum pump 20.

The rotors have for example lobes with identical profiles, such as Roots (eight- or bean-shaped cross-section) lobes. The rotors are angularly offset and driven so that they rotate in a synchronized manner in opposite directions in each stage. During rotation, the gas taken in from the intake is trapped in the space created by the rotors and the stator, and is then carried by the rotors to the next stage. These rough vacuum pumps are referred to as "dry" because during operation, the rotors rotate inside the stator without any mechanical contact with the stator, which enables a complete absence of oil in the pumping stages.

As in the previous embodiment, the outlet 15 of the second rough vacuum pump 20 is connected to the first rough vacuum pump 19, between two in-series pumping stages T4, T5 of the first rough vacuum pump 19, such as between the penultimate pumping stage T4 and the last pumping stage T5.

Connecting the second rough vacuum pump 20 between the pumping stages T4, T5 of the first rough vacuum pump 19 makes it possible to obtain both a doubled pumping flow and a lowering of the ultimate vacuum pressure. At ultimate vacuum, pumping is effective through the five pumping stages T1'-T5' of the second rough vacuum pump 20, to which is added the last pumping stage T5 of the first rough vacuum pump 19.

The invention also applies to other types of multistage rough vacuum pump including two rotors, such as claw pumps or pumps using a similar displacement vacuum pump principle, such as a scroll or screw vacuum pump.

The invention claimed is:

1. A leak detector for checking sealing tightness of an object to be tested, the leak detector comprising:
   a detection inlet for connecting to an object to be tested;
   a pumping device including:
      a first rough vacuum pump including a first drive motor, at least one first pumping stage and one second pumping stage mounted in series between an inlet and an outlet,
      at least one second rough vacuum pump including a second drive motor, at least one first pumping stage and one second pumping stage mounted in series between an inlet and an outlet, the inlets of the rough vacuum pumps being connected in parallel to the detection inlet by a first isolation valve, and
      a turbomolecular vacuum pump having an outlet connected between the first isolation valve and the inlets of the rough vacuum pumps by a second isolation valve; and
   a gas detector connected to the turbomolecular vacuum pump,
   wherein the outlet of the at least one second rough vacuum pump is connected to the first rough vacuum pump between two in-series pumping stages of the first rough vacuum pump.

2. The leak detector as claimed in claim 1, wherein the outlet of the at least one second rough vacuum pump is connected between the penultimate pumping stage and the last pumping stage of the first rough vacuum pump.

3. The leak detector as claimed in claim 1, wherein the at least two rough vacuum pumps are diaphragm pumps, the diaphragms of the pumping stages of the first rough vacuum pump being configured to be moved by the first drive motor and the diaphragms of the pumping stages of the second rough vacuum pump being configured to be moved by the second drive motor.

4. The leak detector as claimed in claim 1, wherein the at least two rough vacuum pumps include two rotors configured to be driven so that they rotate in a synchronized manner in opposite directions in each pumping stage, the rotors of the first rough vacuum pump being configured to be driven by the first drive motor and the rotors of the second rough vacuum pump being configured to be driven by the second drive motor.

5. The leak detector as claimed in claim 4, wherein the rotors are 1 rotors.

6. The leak detector as claimed in claim 1, wherein the at least two rough vacuum pumps are screw pumps or scroll pumps.

7. The leak detector as claimed in claim 1, wherein the at least two rough vacuum pumps have identical pumping stage configurations.

8. The leak detector as claimed in claim 1, wherein at least one of the rough vacuum pumps includes at least two first pumping stages mounted in parallel.

9. The leak detector as claimed in claim 1, wherein at least one of the rough vacuum pumps includes at least three pumping stages mounted in series.

10. The leak detector as claimed in claim 1, further comprising a. purge device configured to supply a purge gas between two pumping stages of the second rough vacuum pump.

\* \* \* \* \*